United States Patent [19]

Sieben et al.

[11] Patent Number: 4,858,008

[45] Date of Patent: Aug. 15, 1989

[54] APPARATUS FOR THE DIGITAL GENERATION OF VERTICAL SYNCHRONIZING AND FIELD IDENTIFICATION SIGNALS

[75] Inventors: Ulrich Sieben, Reute; Heinrich Schemmann, VS-Villingen, both of Fed. Rep. of Germany

[73] Assignee: Deutsche ITT Industries GmbH, Freiburg, Fed. Rep. of Germany

[21] Appl. No.: 249,141

[22] Filed: Sep. 26, 1988

[30] Foreign Application Priority Data

Oct. 2, 1987 [EP] European Pat. Off. ........ 87114403.6

[51] Int. Cl.⁴ .................. H04N 5/04; H04N 5/10
[52] U.S. Cl. ..................... 358/148; 358/153; 358/154; 358/158; 331/20
[58] Field of Search ............. 358/148, 149, 153, 154, 358/158; 331/1 A, 20; 375/119, 120

[56] References Cited

U.S. PATENT DOCUMENTS

| 3,485,950 | 12/1969 | Reiser | 358/139 |
|---|---|---|---|
| 4,110,789 | 8/1978 | Maly | 358/154 |
| 4,459,612 | 7/1984 | Shinkai et al. | 358/154 |
| 4,683,495 | 7/1987 | Brock | 358/154 |
| 4,792,852 | 12/1988 | Narusawa | 358/153 |

OTHER PUBLICATIONS

Patent Abstracts of Japan, Oct. 24, 1981, vol. 5, No. 167 (E-79) (839) Field Discrimination Circuit, Tokyo Shibaura Denki K.K.

Primary Examiner—James J. Groody
Assistant Examiner—Michael D. Parker
Attorney, Agent, or Firm—Thomas L. Peterson

[57] ABSTRACT

A circuit is arranged to derive the internal vertical synchronizing signals and field identification signals for a digital television signal. The circuit operates from the internal horizontal synchronizing signals and the separated external synchronizing signals and employs a sign inverter, an accumulator, an absolute value device, a comparator, a counter and AND gates, as well as an OR gate. These components, as coupled, produce the above-noted signals by digital generation and requires no subcircuits that are independent of the horizontal oscillator which horizontal oscillator is arranged in a phase lock loop.

10 Claims, 2 Drawing Sheets

APPARATUS FOR THE DIGITAL GENERATION OF VERTICAL SYNCHRONIZING AND FIELD IDENTIFICATION SIGNALS

BACKGROUND OF THE INVENTION

The present invention relates to television systems in general and more particularly to a digital circuit for generating the vertical synchronizing signal and identification signals for the first and second fields in digital television receivers.

Digital television receivers are now employed in the processing of the analog television signal. Such digital television receivers typically employ an analog to digital converter whereby the analog television signal is converted into a digital signal. The digital signal may be stored in a memory and further processed in order to obtain various different displays as well as many additional features obtained by operating on the stored digital signal. In this manner the digital signal is then converted by means of a digital to analog converter back to an analog signal where it is applied to a typical television receiver picture tube. The basis of any video digital technique involves quantizing the analog video signal indicative of a television picture into a number of discrete brightness levels or pixels. The video signal is sampled at a rate normally greater than the Nyquist rate. In practice some 256 levels may be used corresponding to an 8 bit data word.

As one will understand, modern television standard employ interlaced scanning techniques. Interlace scanning is achieved by making the horizontal (line scanning) rate an odd multiple of one half the vertical (field scanning) rate. In the United States standards the horizontal rate is 15,750 lines per second. In other words at 30 frames per second the scanning pattern has 525 lines per frame and 262.5 lines per field. In color transmission, the horizontal rate is 15,734.264 lines per second and the frame rate is 29.97 per second. An equivalent statement is that interlacing is achieved when the number of lines per frame is an odd number, thus requiring each field to have an even number of lines plus one half line. Essentially, the typical NTSC system employs two fields in one frame to accomplish a complete television picture scan. Throughout the word there are several different scanning standards in use but all have in common interlaced scanning. In Europe one employs 625/50 standard as for PAL which uses 625 lines per television picture with each picture formed by two interlaced fields at a repetition rate of 50 Hz. The NTSC system, as described above, uses 525/60 standard.

As one can understand, with the advent of digital television receivers, one implements many of the processing techniques by means of digital circuits. Digital circuits, as one will ascertain, are easier to implement and provide more reliable operation than typical analog circuits. Accordingly, digital circuits can be easily employed and fabricated by use of integrated circuits. The use of the integrated circuit enables many of the modular components of a digital television receiver to be implemented.

As indicated above, in order to properly operate a television receiver one must recover the vertical synchronizing signal and further one must obtain identification signals for the first and second fields in a television frame. These signals of course are important to the digital television receiver operation.

As will be explained, according to the present invention, a horizontal oscillator, produces horizontal deflection signals and an internal horizontal synchronizing signal with a 1:1 mark/space ratio the oscillator is operated in a phase lock loop. The use of the phase lock loop eliminates the necessity of performing the internal generation of the vertical synchronizing signal and the generation of field identification signals by means of subcircuits which are separated and separately implemented from the horizontal oscillator.

The format to be described results in a reduction of circuit complexity which in turn leads to an improved utilization of an integrated circuit chip area, if the circuit is implemented as a semiconductor monolithic integrated circuit. The invention to be described also offers the advantages inherent in conventional internal vertical synchronizing signal generation.

It is therefore an object of the present invention to provide an improved digital circuit for generating the vertical synchronizing signal and identification signals for the first and second fields to be employed in a digital television receiver.

It is a further object to provide such a digital circuit which can be easily implemented by means of integrated circuit techniques.

BRIEF SUMMARY OF THE INVENTION

A circuit is arranged to derive the internal vertical synchronizing signals and field identification signals for a digital television signal. The circuit operates from the internal horizontal synchronizing signals and the separated external synchronizing signals and employs a sign inverter, an accumulator, an absolute value device, a comparator, a counter and AND gates, as well as an OR gate. These components, as coupled, produce the above-noted signals by digital generation and requires no subcircuits that are independent of the horizontal oscillator which horizontal oscillator is arranged in a phase lock loop.

BRIEF DESCRIPTIONS OF FIGURES

FIG. 1 is a schematic block diagram of a digital circuit apparatus according to this invention; and FIG. 2 is a series of waveforms designated as A-F and necessary to explain the operation of the invention as depicted in FIG. 1.

DETAILED DESCRIPTION OF INVENTION

Figure 1:
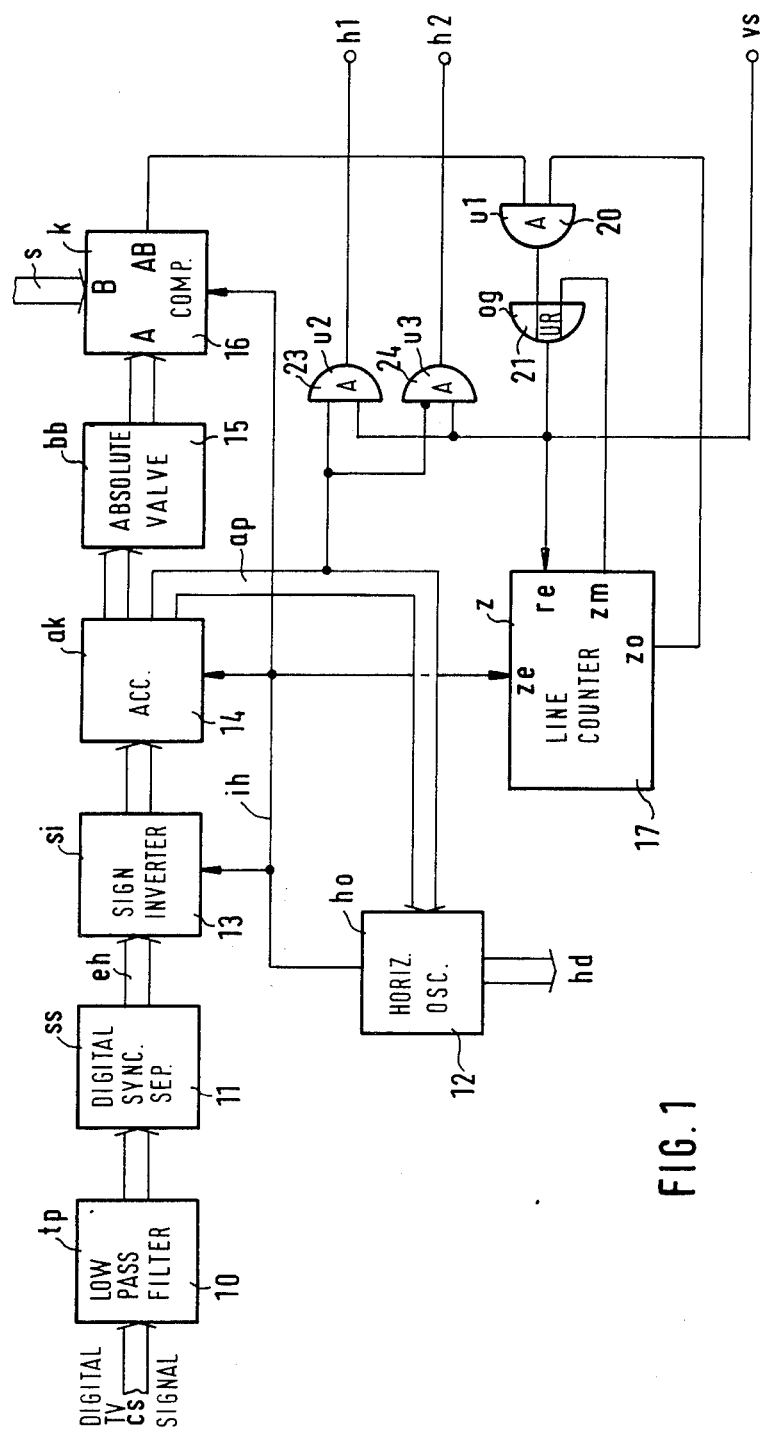

Referring to FIG. 1 there is shown a digital color TV signal CS which is applied to the input of a low pass filter 10 (TP). The digital composite color television signal CS is derived from the analog composite color television signal by means of an analog to digital converter. Such analog to digital converters are widely known and in order to generate a digital signal from the analog signal, such converters are conventionally clocked by a system clock. This is usual practice in digital television receivers and many circuits for converting an analog television signal to a digital television signal are well known by those skilled in the art.

The digital composite color signal CS thus contains the chrominance, luminance, color burst, horizontal synchronizing and vertical synchronizing signals. The video component of this signal is suppressed by means of the low pass filter 10 whose output is coupled to the input of a digital sync separator 11. The function of the sync separator 11 is to conventionally separate the external synchronizing signals, as for example the horizontal and vertical synchronizing signals from the signal at the output of the low pass filter 10.

There are many circuits designated as digital sync separator circuits which will perform this function and such circuits are well known in the art. Sync separators conventionally separate the synchronizing information from the television picture information in the video signal and both analog and digital sync separators are known. The output of the digital sync separator 11 is designated as "eh" which is indicative of the external horizontal synchronizing signals and which signals appear at the output of the sync separator 11. These signals are applied to the signal input of a sign inverter 13. The control input of the sign inverter 13 is fed by the internal horizontal synchronizing signal ih, such that one sign bit is added to the bits of the input signals, with the 1's of the external synchronizing signals eh producing in the sign bit a binary level representing a positive sign. The 0's produce a binary level representing a negative sign.

As one can understand, in the widely used 2's complement representation of binary numbers, a binary level representing 0 will be thus produced in the sign bit if the above-mentioned 1's occur and a binary level representing 1 will be produced in the sign bit if the above-mentioned 0's occur. The sign inverter 13 is an easily implemented circuit configuration. Such inverters 13 are used in computers and microprocessors for performing complement operations and for example provide a first sign or level for binary ones and a second signal level for binary zeros or vice-versa. As one can ascertain from FIG. 1 there is shown a horizontal oscillator 12, (ho). The horizontal oscillator 12, as will be explained, is in a phase lock loop and delivers the internal horizontal synchronizing signal ih which has a 1:1 mark/space ratio in the synchronous state. In addition to this internal horizontal synchronizing signal ih, the horizontal oscillator 12 delivers the digital horizontal deflection signals hd which are shown in FIG. 1 for the sake of completeness and which are processed in the usual manner to produce the horizontal deflection signals for the picture tube of the television receiver. The particular deflection signals are of no interest in regard to this invention and many techniques for generating such signals exist.

Essentially, as indicated above, the output signal of the sign inverter 13, in regard to its input signal, adds a respective sign bit to the input signal depending upon the binary state of the signal. The magnitude of the digital signal, which is of course a binary coded word, remains unchanged. For example, in decimal notation if the input signal has the value 7 and the signal at the control input determines a negative sign, the output signal is −7. If binary code is used to represent positive and negative numbers, the sign inverter 13 converts all bits of the positive number to that of the respective negative number. Many such codes for implementing such digital arithmetic operations are well known and for example are the binary 1 complement or binary 2 complement codes.

The output of the sign inverter 13 is applied to the input of an accumulator circuit 14. Accumulators are also well known circuits and refers to a circuit which stores a number and upon reception of another number adds the two numbers and then stores the sum. Accumulators can include ordinary digital adders or subtractors and storage registers as well as counters and so on. The accumulator 14 is operated and controlled by the same clock system which for example performs the analog to digital conversion. This clock operates to shift information into and out of the accumulator. The accumulator is a conventional circuit and operates to sum either the positive or negative binary numbers during each half cycle of the internal horizontal synchronizing signal ih. The reset and output enable input of the accumulator is controlled by the internal horizontal synchronizing signal ih in such a way that on the positive going edges of this signal the accumulated signal ap, at a first output, is transferred to the control input of the horizontal oscillator 12 and the accumulator will be reset after this operation or transfer occurs.

On the positive and negative going edges of this signal, the result of the accumulation will be transferred to an absolute value device 15 via the second accumulator output. The device 15 essentially receives the output from the accumulator and provides at its output the absolute value of the input. This absolute value is a magnitude which is independent of the sign of the accumulator results. Again, circuits, as 15, for providing absolute value magnitudes from digital data are well known. As one can ascertain, the horizontal oscillator 12 is thus synchronized with the line frequency based on the control signal ap applied thereto and large numerical values will occur in the accumulator 14 only on a field change assigned polarity reversal of the external horizontal synchronizing signals (eh), as in the case in current television standards. The absolute value device 15 produces an output equal to the absolute value of its negative input signal so that the sign bit in its output signal will be eliminated or will only be positive and the numerical value would be transformed into a positive number in accordance with the number representation chosen.

The output of the absolute value device 15 is applied to the minuend input A of a comparator 16. The threshold value S, which is applied to the comparator, is half the positive maximum value of the output signal of the accumulator 14 and is fed to the subtrahend input B of the comparator 16. The comparator 16 is gated by the internal horizontal synchronizing signal ih to operate during that signal.

As further seen in FIG. 1, there is a counter 17. The counter 17 has the count input at input terminal ze also coupled to the internal horizontal synchronizing signal ih. In this manner the signal ih, as applied to the counter 17, causes the counter to count on each edge of this signal. At the 15.625 kHz line frequency of the PAL standard, the counter 17 thus counts at a rate of 31.25 KHZ. Its count capacity is slightly higher than that required for one field. It thus has a count capacity slightly greater than 625 lines, for example equal to 640.

The minuend greater than/equal to subtrahend output AB of the comparator 16 is connected to one input of a first AND gate 20. The other input of the AND gate 20 is connected to the count outputs Zo of the upper third of the count stages of the counter 17. In this manner it is connected to the count output which are provided when the count is greater than 448 in the above example of the PAL standard. As one can ascertain, counters as 17 may include cascaded flip-flop stages to provide binary counts which can be converted to decimal counts. Hence the appropriate counter stages can be accessed. The output of AND gate 20 is coupled to one input of an OR gate 21. The other input of OR gate 21 is connected to the maximum count output zm of the counter 17. This count is indicative of the count 640 in regard to the above-noted example. The output of the OR gate 21 is connected to the reset input re of the counter 17 and provides the vertical synchronizing signals VS.

A second AND gate 23 has one input coupled to the output ap of the accumulator and another input coupled to the output of the OR gate 21. There is also shown a third AND gate 24 which again has one input coupled to the output of the accumulator 14 and one input coupled to the output of OR gate 21. The third AND gate is fed with the inverted sign bit ap of the output of the accumulator 14 while the AND gate 23 has the sign bit of the output of the accumulator coupled directly thereto. Thus gate 23 is gated by one polarity of the accumulator ap and gate 24 by the other polarity.

It is of course understood how AND gates 23 and 24 can be responsive to the inverted and non-inverted outputs of the accumulator. Many circuits for doing this are well known. In this manner the output of AND gate 23 provides the identification signal h1 indicative of the first television field. The output of the AND gate 24 provides the identification signal h2 indicative of the second television field. Referring to FIG. 1, it is of course noted that the sign inverter 13, as coupled to the accumulator 14, operate as a phase lock loop for controlling the frequency of the horizontal oscillator 12. The control signal is afforded by the output of the accumulator 14 which controls the frequency of the horizontal oscillator 12.

Figure 2:
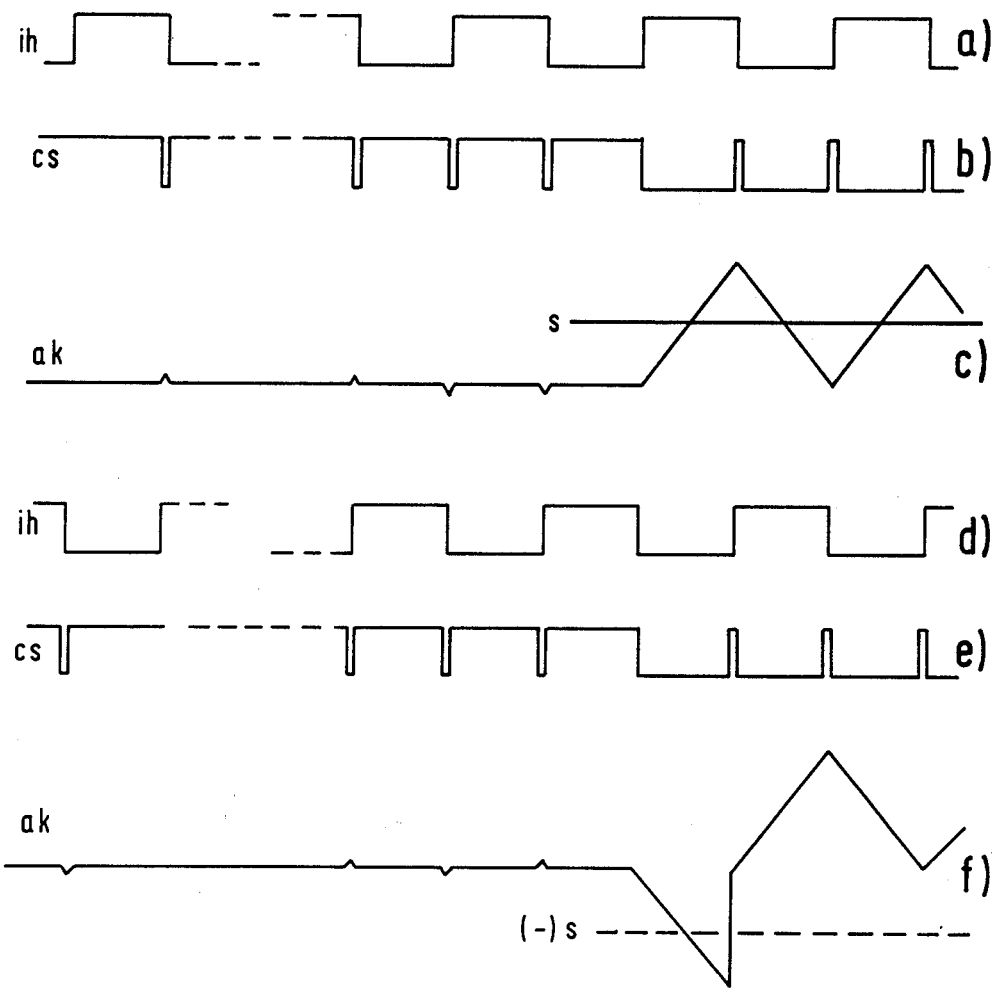

Referring to FIG. 2 there is shown waveforms A–F wherein each waveform is indicative of the signals as indicated and specified in the circuit in FIG. 1. Hence, FIGS. 2a–2c and 2d–2f show the waveforms of the internal horizontal synchronizing signal ih, the digital composite color signal cs and the output signal of the accumulator ak in the range of the transmitted vertical synchronizing pulses for the first and second fields, respectively.

In FIG. 2b the polarity of the signal cs changes with a leading edge of the signal ih while in FIG. 2e this is true for a trailing edge of the signal ih. Prior to this change of polarity only small numerical values appear at the output of the accumulator 14 while after the change the accumulator sums up the input until the above-mentioned maximum value is reached. Thus, no signal appears at the output AB of the comparator 16 prior to the change of polarity so that the counter 17 is reset only upon reaching the maximum count.

This sequence also occurs if no external horizontal synchronizing pulses are present. After the above-mentioned change of polarity, the accumulator 14 sums up the input so that after the sum has exceeded the threshold S, as applied to the comparator input B, the output AB of the comparator 16 provides a signal which will be transferred to one input of the OR gate 21 if the counter 17 is in the upper third of its count. In this manner it is then reset and the signal at the output of OR gate 21 is the vertical synchronizing signal designated as VS.

If this signal is present and the output of the accumulator 14 has a positive sign, the AND gate 23 will be enabled so that the identification signal h1 for the first field will be provided. If the output of the accumulator 14 is negative, the identification signal h2 for the second field will be produced at the output of the AND gate 24.

In FIG. 2f, unlike in FIG. 2c, the threshold value S is shown on the negative side of the zero line because these two figures show the output of the accumulator 14 while the threshold value S is fed to the comparator 16 which follows the absolute value device 15. Referred to a negative accumulator output signal, the effect of the positive threshold value S is therefore that of a negative threshold value $(-)S$.

As one can understand from the above, the output of the accumulator 14 corresponds to the curves of FIG. 2c and 2f. During each television line, if the oscillator 12 is synchronized, the accumulator output is zero. As indicated, the horizontal sync signal ih enables the accumulator in such a way that on the positive going edges of that sync signal the accumulator count will be transferred (via ap) to the control input of the horizontal oscillator 12 and will be reset or cleared after this transfer. When the horizontal oscillator 12 is not yet synchronized, the signal ap is unequal to zero and therefore operates to synchronize the horizontal oscillator 12. Since the signal ap is based, as explained, on the signal eh coming from the digital sync separator, the signal ap as derived from eh and the digital sync separator 11 is transformed to the output signal of the accumulator 14. Hence the synchronization by ap is equivalent to the synchronization by eh. This can be understood since the time relationship of eh and ap are essentially the same.

As one can further understand from FIGS. 2a and 2d each half cycle of ih equals or is equivalent to half the line period. The counter 17 essentially counts the number of line scanning intervals in one field. Since it counts the high levels of the signal ih, the output of the counter 17 is a high level signal when the count of the lines is greater than 448 in each field period.

The output of the comparator AB is at a high level signal when the line frequency count from the absolute value circuit 15 becomes greater than the threshold value S in the first line scanning interval after a change of field or a change of polarity. The output of AND gate 20 is a high level signal upon receipt of the high level input signal from the comparator output in the first line interval following a change of field and provides an output when there is a high level input signal zo from the counter 17 when the counter reaches a count greater than 448 lines for the preceding field. Thus, as should be clear, the above-noted circuit operates to provide a vertical synchronizing signal vs and field identification signals h1 and h2 for the first and second fields in a digital television receiver.

The digital circuit, in accordance with the invention, is especially suited for realization using insulated gate field effect transistor monolithic integrated circuit technology which is suitable for MOS integration.

What is claimed is:

1. Apparatus for generating the vertical synchronizing signal and identification signals for the first and second fields of a television frame by operating on a digital television signal provided by an analog to digital converter for converting an analog television signal to said digital television signal, comprising:

sync separator means having an input adapted to receive said digital television signal for providing at an output digital vertical and horizontal synchronizing signals;

a sign inverter having one input coupled to the output of said sync separator means and having a control input adapted to receive an internal horizontal synchronizing signal for adding a sign bit to said output signal of said sync separator means so that the binary ones of said synchronizing signals provide at an output a first binary level representing a positive sign, while the zeros provide a second binary level representing a negative sign;

an accumulator means having an input coupled to the output of said sign inverter and having a reset and output enable input adapted to receive said internal horizontal synchronizing signal where said internal horizontal signal operates to transfer the contents of said accumulator means at a first output only on positive going edges of said internal horizontal input signal and having a second output for providing said accumulated signal for both positive and negative edges of said internal horizontal synchronizing signals;

a horizontal oscillator having a control input coupled to said first output of said accumulator means and having an output for providing said internal horizontal synchronizing signal with said output coupled to said control input of said sign inverter and to said reset and output enable input of said accumulator means to form a phase-locked loop with said horizontal oscillator which causes said oscillator to provide said internal horizontal synchronizing signal with a 1:1 mark/space ratio at said output;

an absolute value circuit coupled to said second output of said accumulator means to provide at an output the absolute value of said accumulator signal;

a comparator having a minuend input coupled to the output of said absolute value circuit and having a subtrahend input referenced to a threshold value equal to about half the positive maximum value of said accumulator signal, said comparator having an output which provides a signal when said signal at said minuend input is greater than or equal to said signal at said subtrahend input;

a counter having a count input coupled to the output of said horizontal oscillator for receiving said internal horizontal synchronizing signal and operative to provide a count at an output for each edge of said internal horizontal synchronizing signal with said counter having a count capacity greater than that required to count the total lines in a television field, said counter having a first output indicative of an upper count level, and a second output indicative of a total count level, and having a reset input;

a first AND gate having one input coupled to said comparator output and another input coupled to said first output of said counter and having an output;

an OR gate having one input coupled to the output of said first AND gate and another input coupled to said second output of said counter, with the output of said OR gate coupled to said reset input of said counter and said output providing said vertical synchronizing signal;

a second AND gate having one input coupled to said first output of said accumulator means and a second input coupled to the output of said OR gate for providing at an output said identification signal for said first field;

a third AND gate having one input coupled to said first output of said accumulator means and a second input coupled to the output of said OR gate to provide at an output said identification signal indicative of said second field.

2. The apparatus according to claim 1 further including a low pass filter having an input adapted to receive said digital television signal and an output coupled to the input of said sync separator means.

3. The apparatus according to claim 1 wherein said horizontal oscillator has another output for providing horizontal deflection signals.

4. The apparatus according to claim 1 wherein said upper level output of said counter is the upper one third of said counter level.

5. The apparatus according to claim 4 wherein said upper one third is for counts greater than 448 lines for the PAL television standards.

6. The apparatus according to claim 1 wherein said total count capacity is 640 for the PAL television standards.

7. The apparatus according to claim 1 wherein said counter counts at a rate of 31.25 KHZ for the PAL television standards.

8. The apparatus according to claim 1 wherein said third AND gate receives an inverted sign bit output of said accumulator means with said second AND gate receiving a non-inverted sign bit of said accumulator means.

9. The apparatus according to claim 1 wherein said comparator has a gating input coupled to said horizontal oscillator output for enabling said comparator during said internal horizontal synchronizing signal.

10. The apparatus according to claim 1 wherein said sync separator means, said sign inverter, said accumulator means, said horizontal oscillator, said absolute value circuit, said comparator, said counter, said first, second and third AND gates and said OR gate are fabricated on a single integrated circuit chip employing monolithic integrated circuit technology for MOS integration.

* * * * *